D. D. MILLER.
GRAPPLE HAY FORK.
APPLICATION FILED MAR. 1, 1911.
991,873. Patented May 9, 1911.
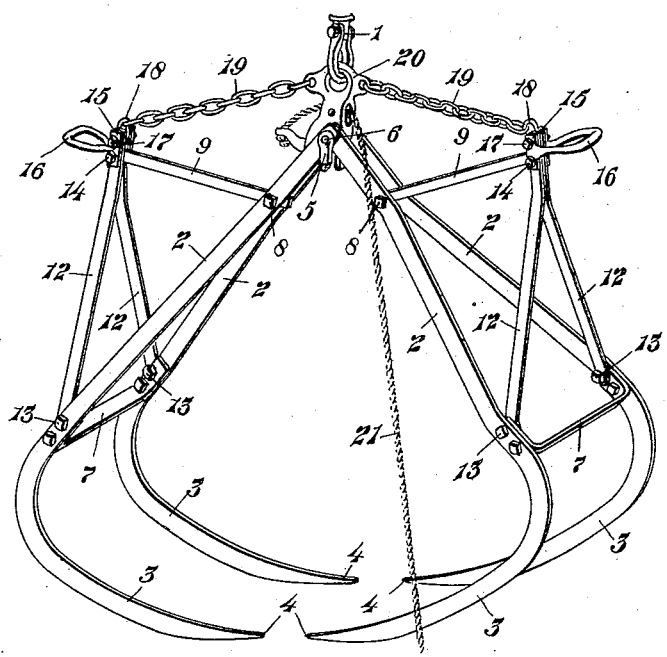
Fig. 1.
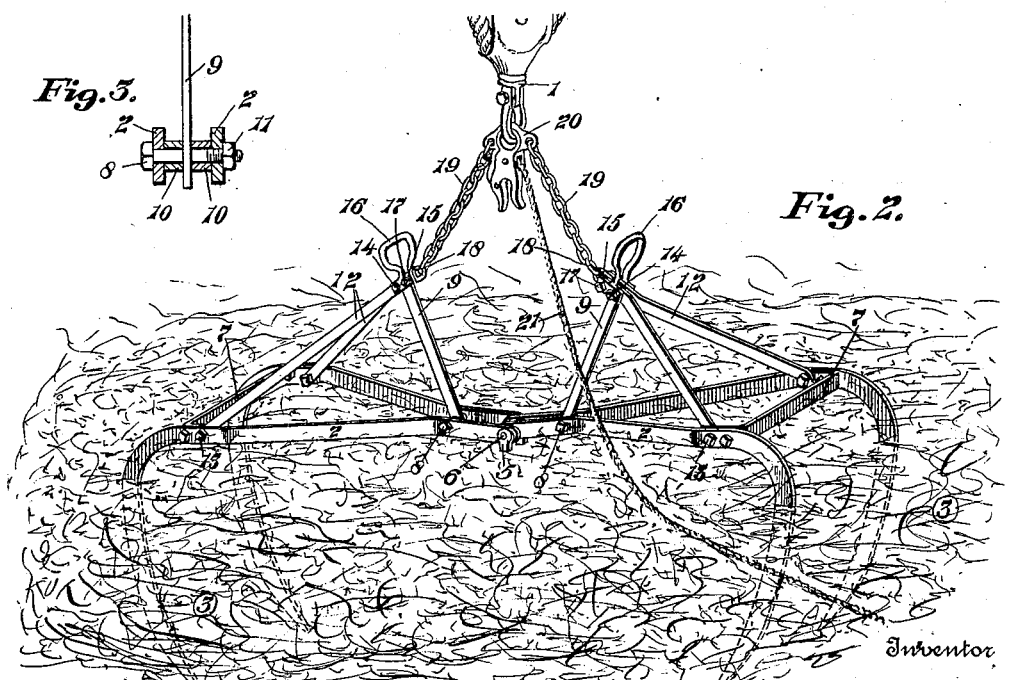
Fig. 3.
Fig. 2.
Fig. 4.
Witnesses
Harry O. Rastetter
Irene Lutz
Inventor
D. D. Miller
By Bond & Miller
Attorneys

UNITED STATES PATENT OFFICE.

D D MILLER, OF CANTON, OHIO.

GRAPPLE HAY-FORK.

991,873. Specification of Letters Patent. Patented May 9, 1911.

Application filed March 1, 1911. Serial No. 611,642.

*To all whom it may concern:*

Be it known that I, D D MILLER, a citizen of the United States, residing at Canton, in the county of Stark and State of Ohio, have invented a new and useful Grapple Hay-Fork, of which the following is a specification.

My invention relates to improvements in hay forks of what is generally known as the grapple type, said hay forks being used principally for the unloading of hay in barns and the like by means of over-head carriers in the manner well understood by those skilled in the art.
The objects of my invention are to generally improve hay forks of the class mentioned, to produce a construction having great strength and durability and at the same time being light in weight, to provide a grapple hay fork thoroughly braced for the strains to which it must be subjected, positive in operation and more convenient to handle and control. These objects, together with other objects readily apparent to those skilled in the art, I attain by the construction illustrated in the accompanying drawings, although my invention may be embodied in other forms, the construction illustrated being chosen by way of example.
In the drawings Figure 1 is a perspective view in elevation of a grapple hay fork embodying my invention in the closed or elevating position. Fig. 2 is a perspective view of the fork showing the same in the open or discharging position, and the tines of the fork inserted in the hay. Fig. 3 is a fragmentary view partly in section showing how the upper brace rod is connected to the frame. Fig. 4 is a fragmentary view partly in section showing how the handles are connected to the braces.

Throughout the several views similar reference numerals indicate similar parts.

The numeral 1 indicates the lifting head of the hay carrier, which forms no part of the present invention but to which the fork is connected for hoisting purposes, as illustrated in the drawings.

The numeral 2 indicates the side pieces of the frames of the fork, which side pieces are extended into the inwardly turned tines 3 provided with the points 4 to permit more ready insertion into the hay. The side pieces 2 at their upper ends are pivotally connected to the head 5 at the point 6 on a horizontally disposed pivot and are spaced from each other near the point where the tines are inwardly turned by the spacing bars 7. It will thus be understood that the two frames of the fork will be adapted for pivotal movement to bring the tines 3 toward each other and in substantially horizontal position as illustrated in Fig. 1 or to throw the tines of the two frames away from each other and pointed downward as in Fig. 2, the two frames in such position lying in substantially the same horizontal plane. On each frame, near the upper ends of the side pieces 2, a bolt 8 is provided which extends through the side pieces 2 and through the upper brace rod 9 and is provided with spacing collars 10 to hold the rod 9 and sides 2 in spaced relation, the nut 11 being adapted to clamp the sides, collars and brace rod together in a substantial way as illustrated in Fig. 3. The lower brace rods 12 are connected at their lower ends by bolts 13 to the side pieces 2 at a point near the spacing bar 7, said lower brace rods extending upwardly, converging, and being fastened to the outer end of the upper brace rod 9 by the bolt 14 which extends through the attaching portions 15 of the handles 16, the lower brace rods 12 and the upper brace rod 9 as best illustrated in Fig. 4.

From an inspection of Fig. 1 it will be seen that the attaching portions 15, formed integrally with the handles 16, extend upwardly beyond the rod 9 as do also the rods 12, and that a bolt 17 passes through the said attaching portions and rods for the purpose of fastening the same together. At the point where the bolt 17 extends from one rod 12 to another it will be understood that there will be an open space, of a width equal to the thickness of the bar 9. At this point a link 18 of the chain 19 is engaged by the bolt 17, thus forming attachment as between the chain 19 and the braces. The upper ends of both chains 19 are connected to the detachable head 20, which head is adapted to detachably engage the fork head 5 for the purpose of lifting the fork and its load as illustrated in Fig. 1, the head 20 being provided with a trip rope 21 which may be pulled by the operator when desired for the purpose of unlocking the head 20 from engagement with the head 5 to permit the discharge of the load from the fork, as hereinafter more fully described.

The details of construction of the locking head 20 are not herein claimed and as heads of similar character are well known to those skilled in the art detailed description thereof is deemed unnecessary. Suffice it to say that the head 20 when in its unlocked condition may readily be detachably connected to the head 5 and when so connected may also be readily unlocked or tripped to detach it from the head 5 by merely drawing upon the trip rope 21. When the head 20 is connected to the head 5 the tines 3, if no hay be engaged by them, are adapted to approach each other until the position illustrated in Fig. 1 is reached, when the chains 19 will become taut and prevent further relative approach of the tines. When the fork is loaded with hay, however, the tines rarely approach each other so closely as illustrated in Fig. 1, and in usual instances when a load of hay is being lifted the chains 19 will be slack, the entire load being suspended from the head 5. It will be understood that in this condition the frames and tines will tend to approach each other as far as the load will permit, thus holding the load securely. When the load has been lifted and transported to the place where it is desired to deposit it the trip rope 21 is pulled, releasing the head 5 from the head 20 and thus throwing the weight of the load upon the chains 19. Said chains, drawing upon the brace rods will cause the frames to swing apart into the position illustrated in Fig. 2, when the load will be free to slip from the downturned tines. The frames will then maintain the position illustrated in Fig. 2 until the fork is again loaded. Upon being lowered for the purpose of grappling another load the operator or operators will be able to very satisfactorily handle and control the fork during the operation of inserting the tines 3 into the hay.

It is impossible without actual experience to appreciate the great difficulty of handling and controlling grapple hay forks upon a loaded hay wagon, there being no convenient place to take hold of the device, and with the usual construction of such devices the loading of the fork is accomplished only by great exertion and with much inconvenience. In my invented construction, however, the handle 16, being rigidly connected to the frames and upwardly spaced therefrom when the fork is in position for loading, said handles may be grasped by the operator or operators and the tines 3 forced down into the hay in a very convenient and comparatively easy manner, said handles being spaced from the upper surface of the hay even when the tines 3 are fully inserted, as illustrated in Fig. 2. Moreover the lower brace rods 12, being connected at their lower ends to the two side pieces of the frames respectively permit the operator to rock or oscillate the fork from side to side as the tines 3 are pushed down into the hay, thus facilitating the loading. The lower brace rods, extending from the handle to the side pieces at points substantially vertically above the points 4 when the fork is in the loading position permit any rocking or oscillating movement of the handle 16 to be very directly communicated to the tines 3 without any bending or straining of the parts.

When the load is about to be discharged from the fork and the trip rope 21 is pulled the place of support for the load will be instantly transferred from the head 5 to the points where the brace rods 9 and 12 are connected to the frames. This will cause an upward pull upon the frames at their outer ends where the side pieces 2 are bent to form the tines and an inward and downward thrust upon the upper ends of the frames where the brace rods 9 are connected thereto. The frames will thus be caused to swing open into the position illustrated in Fig. 2 in a very quick, positive and satisfactory manner.

I claim:

1. A grapple hay fork comprising two frames pivoted to each other upon a horizontally disposed pivot, each frame comprising two side pieces spaced from each other and diverging from their upper ends to their lower ends, inwardly turned tines connected to said lower ends and a handle connected to each frame by three brace rods, one of said rods connected to said handle and to said side pieces at their upper, convergent ends and two of said rods connected to said handle, diverging from each other, and connected to the lower ends of said side pieces, the said handle being arranged in outwardly spaced relation to the plane of the frame.

2. A grapple hay fork comprising two frames pivoted to each other upon a horizontally disposed pivot, the sides of said frames diverging toward their free ends, inwardly turned tines connected to the free ends of said frames, each frame provided with an upper brace rod connected at one end to said frame near the said pivot, and with lower brace rods connected at their lower ends to said frame at the free end thereof, the upper ends of said lower brace rods converging and being fastened to each other and to the other end of said upper brace rod, and handles connected to said upper and lower brace rods at the point where said brace rods are connected together.

3. A grapple hay fork comprising two frames pivoted to each other upon a horizontally disposed pivot, each frame provided at the free end with inwardly turned tines, said frames adapted for pivotal movement to bring said tines into hoisting position, said tines being then substantially horizontally disposed, and into discharging position, said two frames then lying in substantially the same plane and said tines downwardly directed, and a handle connected to each frame by three brace rods, one of said rods connected to said handle and to the upper end of said frame and two of said rods connected to said handle and to the lower end of said frame, said handle arranged in outwardly spaced relation to the plane of the frame, and the point of attachment of said brace rods to the lower end of the frame lying substantially vertically above the ends of said tines when the device is in the discharging position.

4. A grapple hay fork comprising two frames having spaced side pieces, said side pieces having integral, extended, inwardly turned tines, the upper ends of said side pieces pivotally connected to a fork head on a horizontally disposed pivot, spacing bars arranged between and connected to said side pieces at points near where said side pieces are inwardly turned to form the tines, an upper brace rod attached to the side pieces of each frame near the upper ends thereof, lower brace rods connected at their lower ends to the side pieces of each frame at a point near said spacing bar, and at their upper ends to the outer end of said upper brace rod, handles connected to said upper and lower brace rods where said rods are connected together, chains, each having one end connected to said brace rods at the point of attachment of said handles, and the other end connected to a detachable head adapted to detachably engage said fork head, said detachable head adapted to be released from said fork head, whereby the weight of the load is transferred from said fork head to said brace rods.

5. In a grapple hay fork a frame comprising two spaced, downwardly diverging side pieces, tines connected to the lower ends of said side pieces, an upper brace rod connected to said side pieces at the upper ends thereof and two lower brace rods connected at their lower ends to said side pieces at points adjacent the points of attachment of said tines, a handle and said handle and the other ends of said three brace rods connected together at a point outwardly spaced from the plane of said frame.

6. In a grapple hay fork a frame comprising two spaced, downwardly diverging side pieces, tines connected to said side pieces at their lower ends, a spacing bar extending from one side piece to the other adjacent the points of attachment of said tines and three brace rods connected together at a point outwardly spaced from the plane of said frame and having their inner ends connected, one to both sides at their upper convergent ends, and one each to said two side pieces at their lower divergent ends.

In testimony that I claim the above, I have hereunto subscribed my name in the presence of two witnesses.

D D MILLER.

Witnesses:
WILLIAM H. MILLER,
IRENE LUTZ.

---

Copies of this patent may be obtained for five cents each, by addressing the "Commissioner of Patents, Washington, D. C."